US008806061B1

(12) United States Patent
Lobo et al.

(10) Patent No.: US 8,806,061 B1
(45) Date of Patent: Aug. 12, 2014

(54) SYSTEM, METHOD, AND COMPUTER PROGRAM PRODUCT FOR AUTOMATED CATEGORIZATION OF DATA PROCESSING SERVICES AND COMPONENTS

(75) Inventors: Sanjay P. Lobo, Allen, TX (US); Jeff B. Cotten, Addison, TX (US); Jeffrey L. Wacker, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3868 days.

(21) Appl. No.: 10/940,424

(22) Filed: Sep. 14, 2004

(51) Int. Cl.
*G06F 15/16* (2006.01)
*G06F 15/173* (2006.01)

(52) U.S. Cl.
USPC .................. 709/246; 709/203; 709/223

(58) Field of Classification Search
USPC ................... 709/246, 203, 223; 705/11
See application file for complete search history.

(56) References Cited

U.S. PATENT DOCUMENTS

| 6,092,189 A * | 7/2000 | Fisher et al. ............ 713/1 |
| 7,100,195 B1 * | 8/2006 | Underwood ............ 726/2 |
| 7,289,964 B1 * | 10/2007 | Bowman-Amuah ....... 705/1 |
| 7,467,198 B2 * | 12/2008 | Goodman et al. ........ 709/223 |
| 2003/0144901 A1 * | 7/2003 | Coulter et al. .......... 705/11 |
| 2006/0248504 A1 * | 11/2006 | Hughes ................. 717/101 |

* cited by examiner

*Primary Examiner* — Ninos Donabed
*Assistant Examiner* — Thomas Richardson

(57) ABSTRACT

A system, method, and computer program product to enable component providers to submit components, along with associated metadata for the component, to a service brokerage system. This allows the brokerage to automatically categorize the component and enables the assembly of the components into services.

21 Claims, 8 Drawing Sheets

SYSTEM, METHOD, AND COMPUTER PROGRAM PRODUCT FOR AUTOMATED CATEGORIZATION OF DATA PROCESSING SERVICES AND COMPONENTS

CROSS-REFERENCE TO RELATED APPLICATIONS

The present application may include some text and figures in common with, but is otherwise unrelated to, the following United States patent applications, all of which are hereby incorporated by reference: Commonly assigned patent application Ser. No. 10/878,722 for "System, Method, and Computer Program Product for Brokering Online Services and Applications", filed 28 Jun. 2004, commonly assigned patent application Ser. No. 10/941,003 for "System, Method, and Computer Program Product for Client-Service Provider and Service Provider-Vendor Agreement Translation, Configuration, and Monitoring", filed concurrently herewith, commonly assigned patent application Ser. No. 10/941,038 for "System, Method, and Computer Program Product for Brokering Data Processing Services", filed concurrently herewith, and commonly assigned patent application Ser. No. 10/940,425 for "System, Method, and Computer Program Product for Brokering Data Processing Service Licenses", filed concurrently herewith.

TECHNICAL FIELD OF THE INVENTION

The present invention is directed, in general, to providing data processing services categorization.

BACKGROUND OF THE INVENTION

Historically system integrators have purchased the hardware, software, and services from vendors that they in turn sell to their services clients. A services brokerage model offers a new paradigm for system integrators by pushing ownership of those hardware and software assets on to the vendor until the asset is provisioned and sold as a part of a service through the brokerage. This type of business model requires new processes and data models for managing and tracking those assets.

There are no standards offered by the market place in the data or the structure of the data that needs to be exchanged between the vendor or component provider and the brokerage. The impact to this lack of well defined standards is a lack in automated processes and systems to transmit this data from entity to entity leaving the door open for inconsistent and inaccurate information.

In addition, traditional catalogs for software do not provide a service-view perspective into these components. There is a need for a smart services catalog to enable enhanced and automated service order management.

There is, therefore, a need in the art for a system, process and computer program product for automated categorization of data processing services and components.

SUMMARY OF THE INVENTION

Various embodiments provide a system, method, and computer program product to enable component providers to submit components, along with associated metadata for the component, to a service brokerage system. This allows the brokerage to automatically categorize the component and enables the assembly of the components into services.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

Various embodiments provide a system, method, and computer program product that provides an information technology (IT) services brokerage platform, including an enterprise web services brokerage (EWSB), that facilitates the order management, service fulfillment and service management of web services and web-services-enabled applications in a utility based subscription model.

Figure 1:
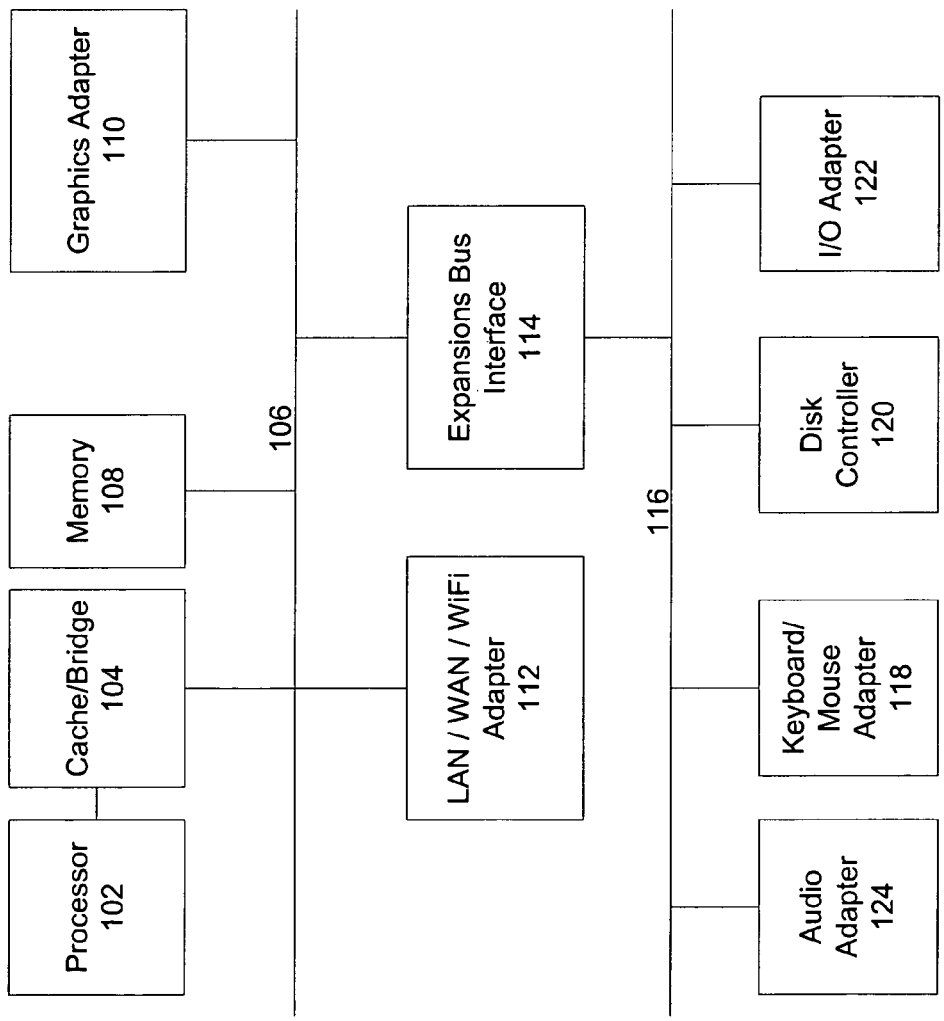
FIG. 1 depicts a block diagram of a data processing system in which a preferred embodiment can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows', a product of Microsoft Corporation located in Redmond, Wash. may be employed if suitably modified. The operating system is modified or created in accordance with the present invention as described.

Figure 2:
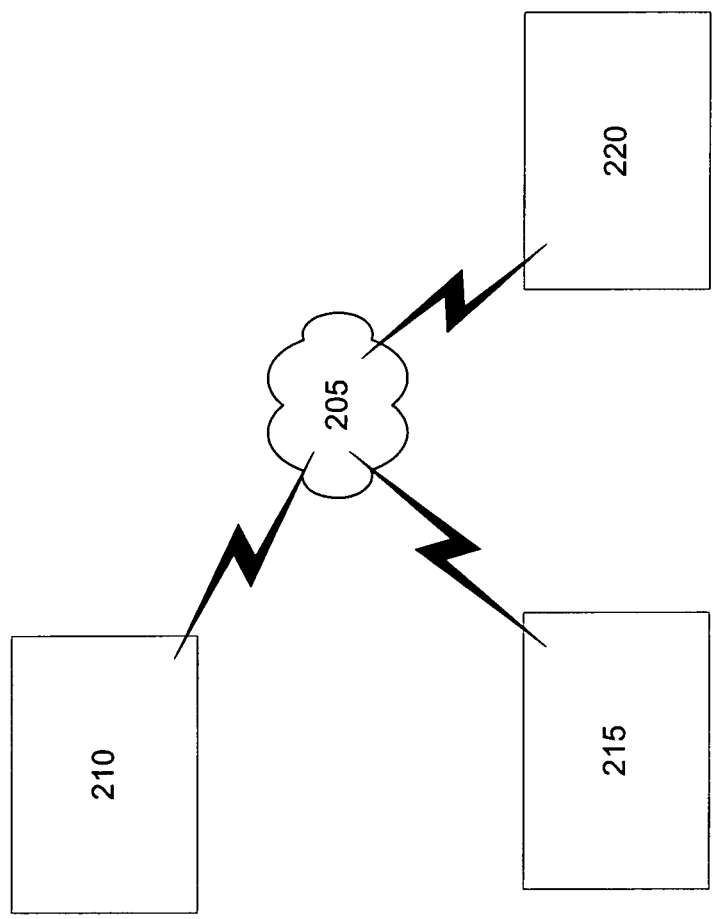
FIG. 2 depicts a block diagram of a data processing system network in which an embodiment of the present invention can be implemented.

FIG. 2 depicts a block diagram of a data processing system network in which an embodiment of the present invention can be implemented. In this figure, network 205 is any known type of computer network, including private networks or public networks such as the internet. While network 205 is shown in only one instance here; as known to those of skill in the art, network 205 can be implemented in multiple separate networks, or in the same public or private network system. Of course, any data or network communication described herein can be implemented using any known data communications means, such as via telephone modem, xDSL, fiber optic, wireless, etc., or public or private networks. These communications will include data pertaining to purchases and refunds, taxes, and other functions, as known in the art and/or as specifically described below.

Server 210 is shown communicating client systems 215/220 via network 255. Server system 210 is a data processing system server, configured to communicate with multiple different client systems, including client systems 215/220 and others.

It is understood that client systems 215/220 and server system 210 may be co-located or placed at different locations, or be otherwise structured as known to those of skill in the art, so long as they are capable of together performing the functions described and claimed herein.

Various embodiments provide a system, method, and computer program product to enable component providers to submit components, along with associated metadata for the component, to a service brokerage system. This allows the brokerage to automatically categorize the component and enables the assembly of the components into services.

A paradigm shift from the traditional on-site outsourcing (facilities management) to a utility-based leveraged infrastructure model is eminent. Managed service providers will utilize their existing data centers to support this new business model and broker their services to small-medium-enterprise customers. A utility based service provides for either a subscription-based or pay-by-the-drink model.

The disclosed data processing services brokerage is a revolutionary concept in enterprise data processing services, wherein everything offered through the brokerage is packaged as a service. The component providers retain ownership of the services being brokered until the service is consumed by the customer. The types of services that are offered through the brokerage can include applications, infrastructure, content, and processes. The brokerage facilitates the location of these services for the consumer as well as provisions, hosts, and serves up these services to the consumer on behalf of the component providers. In addition, the brokerage also manages and monitors the services being provided through the brokerage and bills the consumer based on subscriptions or pay-per-use.

Figure 3:
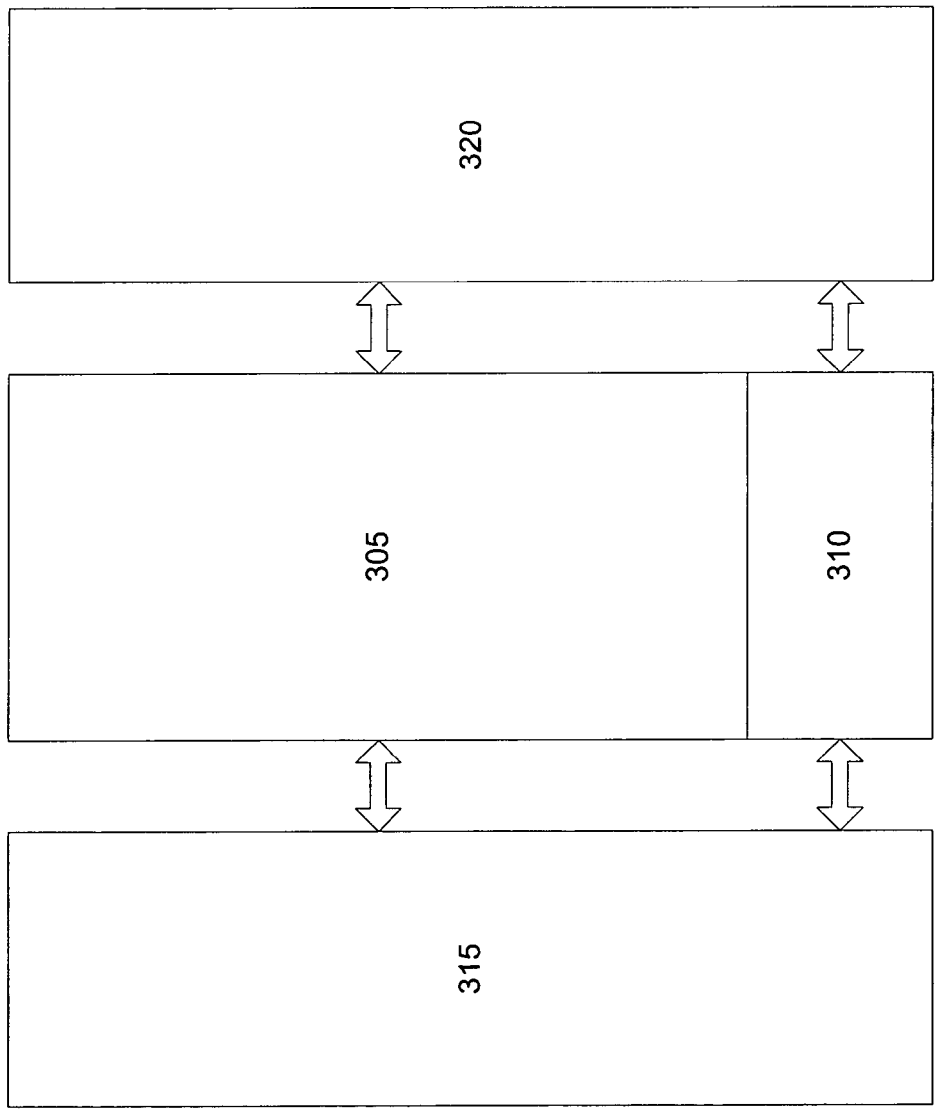
FIG. 3 depicts a block diagram of a data processing services brokerage system in accordance with a preferred embodiment.

FIG. 3 depicts a block diagram of a data processing services brokerage system in accordance with a preferred embodiment. The data processing services brokerage is a platform that enables development, packaging, provisioning and management of data processing services in a utility based subscription model.

This framework provides for existing businesses to build an alternative business model and start to mature it before getting rid of their traditional (existing) operating model. The framework suggests a sell-side and buy-side of services that is facilitated through a brokerage.

In FIG. 3, the data processing service brokerage framework which includes a buy-side market 315, a sell-side, represented by service component providers 320, and the brokerage, including system 305 and billing, collection and funds distribution system 310.

Here, system 305 is an integration, packaging, and distribution system in accordance with a preferred embodiment. This system, as described in detail below, includes packaging, a BLA configurator, portal distribution/visibility, billing calculation, and remote asset management. System 305 also includes an integration and BLA-SLA template application, configuration specification, and simulation/model drive specification. System 305 also includes, in a preferred embodiment, asset location/procurement, load balancing, metrics generation, and planning and scheduling.

Market 315 includes, in various embodiments, service consumers such as component buyers, global 2000 companies, small and medium businesses, and business process outsourcing (BPO) services. Market 315 communicates with system 310 and system 305.

Component service providers 320 include providers of processes, such as best practices and business rules. Component service providers 320 also includes providers of content providers, such as commercial, public domain, and private domain content. Component service providers 320 also includes providers of applications such as code objects, custom applications, productivity packages, and enterprise packages.

The Markets: On the buy-side, the target market includes large enterprises and SMB (small and medium businesses) while continuing to serve traditional marketplaces. This business framework opens the opportunity for software providers that have traditionally been geared for large enterprises, to now provide the same services to small and medium size enterprises. As markets migrate to utility pricing the trading markets will generate less revenue for component providers and must be offset by opening new markets (i.e. new economic model).

The target market on the buy-side also includes component buyers that may be part of small, medium, or large enterprise but could also include private individual buyers. It is believed that there will be an opportunity for a marketplace of component buyers that are looking for code objects and application components. This could be enabled via a 'developer zone'. The developer zone could be linked to a smart catalog of the available code objects, application components, certified open source components, etc. The idea of reusability of code objects has been there for some time but largely unrealized by large enterprises. Code owners could use this model to store and sell these services through the broker for a usage fee. In addition, new application development could be transformed into a new thin presentation only client where the business logic services that are required by the application now reside in the brokerage and there is a pay-per-use access fee associated with this access. This opens a whole new way of application development and presents a low barrier of entry in terms of cost for small and medium businesses that have been deterred by the expense of infrastructure costs. This model provides access to these services while managing the complexity of hosting and managing them.

Additionally, BPO services is value-add service that spans across these target markets. There is an opportunity to define a BPO services provider via a predictable/guaranteed (Knowledge services, etc.). This model also facilitates the provisioning of standard and custom industry solution packs (i.e. Financial, retail, etc.).

The business contracts for services are based on Business Level Agreements (BLA). In the next section that describes the customer interface we will describe the process of collecting business requirements and translating them to business level agreements. The BLA can be used as the contractual agreement for services between the brokerage and the consumer of the service.

The business framework provides for different go-to-market models such as online, private and to-go.

Component Providers: The Data processing services Brokerage Business Framework addresses the component provider market in a very unique way. The expectation for the market is that all Data processing services including infrastructure, applications, content and process could be exchanged with the consumer of the service through this brokerage framework. Traditionally, we have had applications on demand and more specifically packaged applications that have been provisioned within the enterprise.

Component Providers own all assets until paid for by customer. The Data processing services Brokerage frameworks suggest that we move away from the traditional way of providing Data processing services where the Data processing services provider makes the 'Build it and they will come' infrastructure model and then pay for the entire build out. The framework proposes that the risk and profits associated with the build-outs should be shared between the Data processing services providers and the component providers.

Data processing service providers need to enforce a contractual agreement with these component providers by entering into a Provider Level Agreement (PLA) through which they agree to providing standard interfaces, performance levels, penalties for non-conformance, and legal and financial arrangements for payment of services.

As per this model there is a selection of preferred component providers and secondary component providers. The preferred component providers receive priority allocation. In the event they are unable to provide the level of service or the service itself then a bid for the service will be made available to the secondary component providers via a reverse/blind reverse auctioning mechanism.

Component providers could also include patent owners of best practices, unique processes, etc. that up to this point have been unable to find a venue to monetize and sell the royalties of their intellectual properties.

The Brokerage Services consists of three high-level sections—the consumer interface, intelligent broker, and the provider interface.

The consumer interface is an enterprise portal that provides a single entry point for request and provisioning of all available Data processing services. This access point inherits the portal functionality such as personalization, user and role based authentication, single point of entry, etc. The portal ties into the identity management services to manage the personal identity of the user, catalog of services through the services registry, and a consolidated view to the business and system analytics via the management dashboard. The portal offers several views—the Developer Zone, pre-packaged and custom applications, standard and custom industry solution packs, and BPO packs.

The consumer interface could also have a federated and distributed catalog of services, in this case referred to as the smart catalog. The catalog also consists of other component services such as infrastructure (compute, storage; and communication) packs, content, and processes packs. The catalog is managed by the brokerage and has views for each of the component providers.

A service assembly tool—SAT (also referred to as the configurator) is available to the consumer via the consumer interface. A developer who may be a consumer accesses the brokerage via this consumer interface, could use the SAT to assemble the code objects and other ancillary services to build composite services. Business users could use the SAT to input their business requirements and be able to generate the desired custom solution pack. The SAT also assists with the generation of the Business Level Agreement for the service based on the configured solution pack.

The intelligent broker is the second section within the brokerage services. Here, the business level agreements are translated to service level agreements (SLA) where a pick-list of required services is generated. This is also where the SAT uses standard and custom templates (solution, industry, etc.)

to integrate and assemble solutions once the components have been acquired from the component providers. The associated configuration and operational templates provide service fulfillment (service activation and service provisioning), service activation, and the metering and billing of the services. The SLA is monitoring for conformance in conjunction with monitoring the Business Level Agreement and the Provider Level Agreement.

The provider interface is used to request, reserve, and acquire services from the component providers. The SLA uses the list of services requested to generate a granular component list used to select the component providers. It also generates the Provider Level Agreement associated with the delivery of these services. As mentioned above the PLA is monitored for conformance and there are penalties for non-conformance. These penalties could include financial and preferred provider status implications.

There is an additional feature available at the consumer interface level that provides for modeling and simulation. This assists in the usage predictions and forward pricing for the services.

A paradigm shift from the traditional on-site outsourcing (Facilities Management) to a utility-based leveraged infrastructure model is eminent. Managed Service Providers will utilize their existing data centers to support this new business model and broker their services to small-medium-enterprise customers. A utility based service provides for either a subscription-based or pay-by-the-drink model.

The industry term SLA (Service Level Agreement) has been commonly used to define the contractual terms of the level of service a service provider would provide a consumer of the service. A significant limitation of this traditional SLA role is that each SLA covers only those service available from a single service provider, so the consumer must assemble those services himself in order to build the service package or functionality he seeks.

Business Level Agreements (BLA), as used herein, incorporate the business requirements from a consumer requesting the service into contractual business terms. For example, the BLA will specify the services, capacity, and other specifications that the customer requires. Typically, to satisfy BLA requirements, services from multiple vendors are required.

Once the consumer approves the BLA it is translated into an SLA that defines more technical and/or business terms for the fulfillment of the service (i.e., service activation and provisioning), including the services required from multiple service providers. It also includes the terms for assurance, metering and billing of the service. If the services broker does not comply with the SLA then there are typically business/financial consequences.

The preferred embodiment also uses a Provider Level Agreement (PLA). In the past, the service providers made all the investment for setup and bought all the resources (application and hardware infrastructure) to manage the services. The preferred embodiment facilitates a shift from an all-risk model to a risk-sharing model, wherein component providers, i.e., hardware, software, storage and network providers, share the risk with the services broker. Once a component pick list is generated by the SLA there will be a contractual agreement between the component provider and the services broker requesting the component.

This contractual agreement is referred to as the PLA (Provider Level Agreement). The PLA ensures that the component provider consistently provides the level of service contracted. In the event there is non-compliance with the contracted PLA, the services broker preferably has the option to source the component through another component provider instead of the preferred provider via down-select list or component provider auction, impose the necessary financial fines that they (services broker) will have to incur as part of non-compliance to the BLA, and deselect the content provider if there is re-occurrence. Real-time monitoring of the BLA, SLA and PLA is very critical to the success of this model.

The overall process architecture of the translation and monitoring of BLA to SLA and SLA to PLA consists of three primary components. They are BLA to SLA translation, SLA to PLA translation, and BLA, SLA, and PLA monitoring. These take place, in the preferred embodiment, in system 305.

Figure 4:
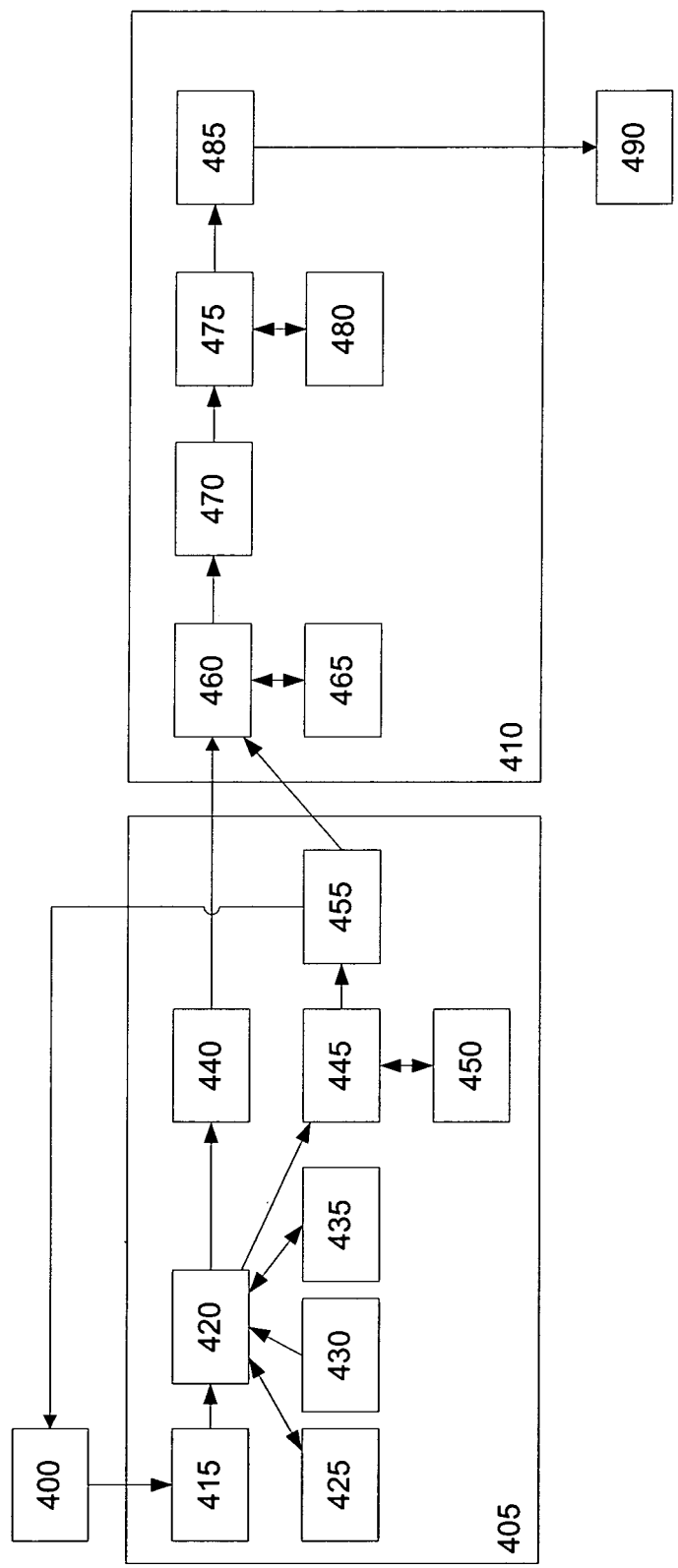
FIG. 4 depicts a functional process architecture and method in accordance with a preferred embodiment.

FIG. 4 depicts a functional process architecture and method for translation of Business Level Agreement to Service Level Agreement, including the broad process 405 of translating business requirements to a business level agreement, and the broad process 410 of translating the business level agreement to a service level agreement. To ensure success of the utility model, services brokers must develop economically attractive models for new and existing customers. Identified in this section is a process of using the business requirements 415 provided by a consumer 400 of a service(s) to assemble a set of business-level contractual terms defined in the Business Level Agreement (BLA) 455. The BLA 455 is translated to a Service Level Agreement 470 that identifies the technical and/or business requirements.

The service levels being provided by the services broker to the consumer must be managed with high level of efficiencies that should be supported by effectively translating the business requirements to Business Level Agreements (BLA) using templates, automation, real-time monitoring for compliance and self-learning process engines.

The process includes both manual and automated steps. The consumer 400 produces a set of business requirements 415 to input into a service assembly tool referred to as the configurator 420. The configurator uses the services catalog 435, a set of service order templates 430, and the business requirements 415 to develop a services pick-list 440. This services pick-list 440 contains all of the services offered by the services broker that were determined by the configurator 420 to meet the business requirements 415. The configurator also integrates the consumer's budgeting model data 425 that could help in predicting the level of services to be provided.

The service pick list can have one or more services listed. The Business Level Agreement (BLA) generator 445 uses the service-defined parameters identified by the configurator 420 to produce the BLA 455. The BLA is submitted to the consumer for approval. BLA generator 445 also uses BLA metadata 450.

Upon receipt of approval of the BLA 455 (which can be automated), the BLA 455 is translated to SLA(s) 470 using a translator 460. The translator 460 uses a repository 465 of SLAs, business rules, and SLA templates for the translation. The generated SLA(s) 470 are fed into the component list generator 475 that uses the component catalogue 480 to develop a component pick-list 485 of infrastructure (hardware, software, storage and network) components required to deliver the service. This component pick-list is used by a service fulfillment engine, 490 to assemble and provision the service.

Figure 5:
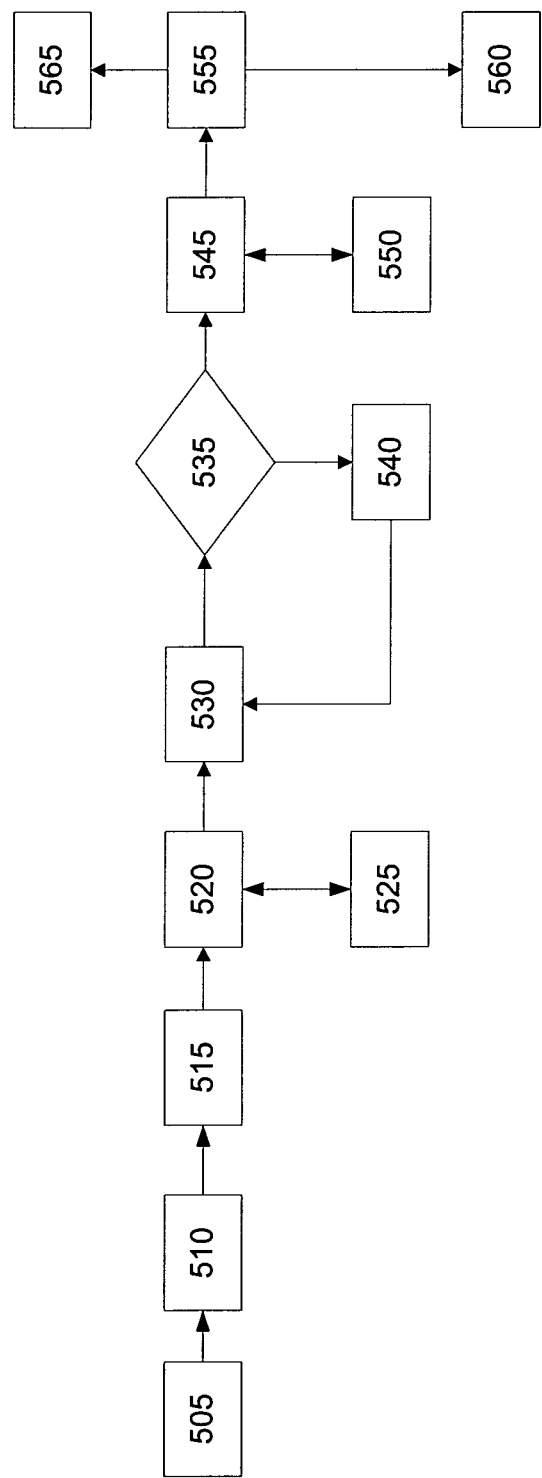
FIG. 5 depicts a process in accordance with a preferred embodiment.

A process of translating the SLA to PLA is illustrated in FIG. 5. Service providers have used SLAs as the technical contractual agreement to guarantee services to the consumer of the services. With the brokerage model the contractual agreement is deferred to the BLA (Business Level Agreement) as described above. The SLA 505 is positioned as the internal brokerage governance to manage and monitor the BLA. The SLA 505 consists of a pick-list of services that has been requested. The SLA 505 is consumed by the Component List Generator 510 to generate a component pick-list 515 (hardware, software, storage, and network) to be packaged for the service requested.

The selection of the component providers should be well orchestrated to enable real-time ordering, provisioning, and activation of the requested components. The services broker has provider list 525, typically with a set of preferred component providers. These preferred component providers own these components in the brokerage until they have been sold (on a usage basis) via the services broker to the consumer. In order to maintain and manage a required level of service needed by the services broker, there needs to be a contractual agreement between the service broker and the component provider. This is being defined as the PLA (Provider Level Agreement).

Once the component pick list has been generated, it is used by the component provider list & preferred provider generator (CPLPPG) 520 to produce the component provider list 530. The CPLPPG 520 uses the database of preferred component providers that have been categorized by the type of services.

The process then checks the availability 535 of the component for each of the component providers. If the component is available then the PLA generator 545 will generate a provider level agreement 555 for that component between the service broker and the component provider 565, using PLA metadata 560. In the event the component is unavailable the service broker looks to a reverse auction option 540 where the second or third choice of the component provider has a chance to bid for providing the components. The reverse auction should be done in real-time and/or by proxy to offer the component immediately. Once the bid is open the component provider that meets the requirements with the lowest cost is the one selected.

After PLA 555 is created, it is sent to service fulfillment engine 560.

BLA, SLA and PLA Monitoring: Monitoring BLAs, SLAs, and PLAs is an important aspect of the operation of the services broker. It provides the necessary assurances to the consumers that the level of services that they are buying are performing as expected. It will also provide metrics to the consumer, the services broker, and the providers so that they will be able to validate that the services are performing at contracted levels.

The architecture of the brokerage includes system monitoring tools that are monitoring all aspects of the services being provided. There are monitoring tools for networks, storage, processor, and application availability and performance. These tools will provide the metrics to the various dashboards for validation.

FIG. 3 is used to illustrate the continuous monitoring of business level agreement, service level agreement, and provider level agreement.

The consumer, a part of market 315, will be monitoring the Business Level Agreements that they agreed to, preferably via a dashboard that is providing them real time metrics on their services. The dashboard also notifies the consumer of different types of conditions. For example, if the consumer has actually been utilizing a lower level of service than they originally agreed to the dashboard will notify them that they may be able to obtain lower costs depending on the type of service. In addition, the dashboard also notifies the consumer if they have exceeded the level of service that they originally agreed to or if the service is not performing to the level that they originally agreed to.

The component providers 320 will be monitoring the performance level of the components they are providing and the associated Provider Level Agreements that they contractually agreed to via a dashboard as well. The component provider will be notified via the dashboard if one of their components is not performing as expected. Depending on the type of service being offered there will be an automated process that switches out a failing component for a good one when the monitoring tools discover a failing component. If that occurs this will be reported to the dashboard for the component provider.

The services broker of system 305 also utilizes a dashboard to monitor not only the internal SLAs, but also the BLAs and PLAs. The services broker's dashboard will be a comprehensive view into the entire monitoring process. By monitoring the performance of the internal SLAs the services broker will be able to ensure that the contracted BLAs are being met. This dashboard will notify the services broker of all conditions. If there are components being provided by component providers 320 that are no longer needed then the dashboard will notify the services broker of that condition to remove the excess capacity. The same automation process reference above in the components providers 320 will be utilized to automatically remove excess capacity if the component is a type of component that allows for automation.

Historically system integrators have purchased the hardware, software, and services from vendors that they in turn sell to their services clients. The disclosed services brokerage offers a new paradigm for system integrators by pushing ownership of those hardware and software assets on to the vendor until the asset is provisioned and sold as a part of a service through the brokerage. This type of business model requires new processes and data models for managing and tracking those assets.

There are no standards offered by the market place in the data or the structure of the data that needs to be exchanged between the vendor or component provider and the brokerage. The impact to this lack of well defined standards is a lack in automated processes and systems to transmit this data from entity to entity leaving the door open for inconsistent and inaccurate information.

In order to automate the services brokerage a process is used to allow component providers to submit the components along with the metadata for the component that they are providing. This allows the brokerage to automatically categorize the component and enables the assembly of the components into services.

The process for submitting the component metadata and the subsequent categorization and assembly into services is described by FIG. 6 below.

Figure 6:
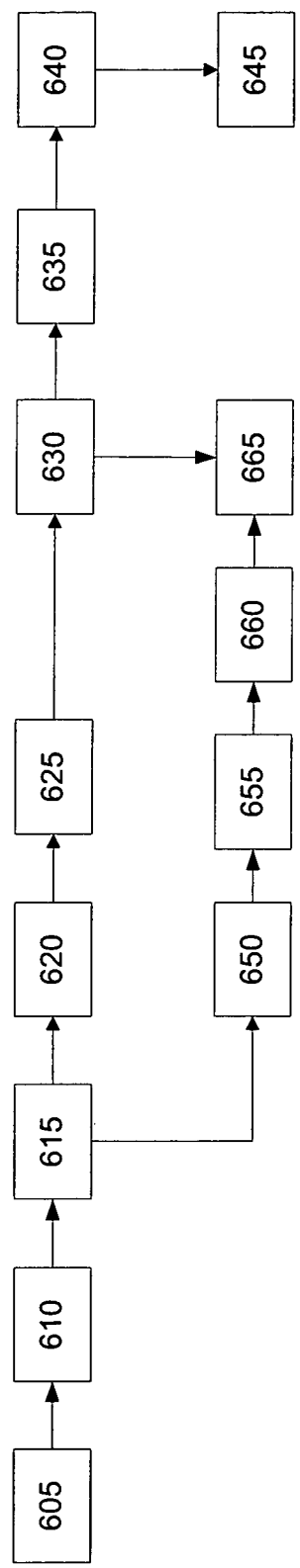
FIG. 6 depicts a process for exchanging component meta data between a component provider and the broker system, in accordance with a preferred embodiment.

FIG. 6 depicts a process for exchanging component meta data between a component provider and the broker system.

The component provider 605 will access a provider interface 610 of the services brokerage, over the internet or other network and submit the component 615. Depending on the type of component, the component provider will submit both the component 650 and a Component Categorization File (CCF) 620 to the services brokerage. In the preferred system and method, the CCF is a metadata file that self-describes the component being submitted so that it can be categorized by the brokerage. The CCF structure will follow the component categorization structure described herein.

There will be many different types of components that will not be able to be physically submitted to the brokerage such as a physical server for processing units or storage device for storage units. In these cases only the CCF 620 will be submitted. However in the case of applications and content these components 650 will be electronically transmitted to the infrastructure of the services brokerage.

Once the services brokerage has received the CCF it will run it through an automated validation process 625 to ensure that the structure and format of the file is accurate, using techniques known to those of skill in the art. It will also ensure that required elements of the metadata are included.

In parallel to the CCF validation process 625, the component 650 will be installed into the infrastructure of the services brokerage. Included in this installation process is an introspection process 655 to discover the attributes and elements of the component, preferably using known introspection techniques. In addition, location information about how to execute, read, or invoke the component, such as the URL for the Web Services Description Language (WSDL) in the case of a web service or the domain name system DNS and connection information in the case of raw data, will be abstracted. The system also performs a run-time validation 660 of the component.

The results of the introspection 655, including location information are stored in component repository 665, and the metadata from the CCF file will be stored 630 in a component repository 665. This will effectively categorize the component via the information coming from all of these sources.

After the component has been stored and categorized it is ready to be assembled into the end services. A service categorization assembly module 635 will use the metadata about the component to determine which services the component is eligible to be a part of and should be a part of. This is done by using the type information for the component, the industry and business process information and all of the other types of attributes described in the Component Categorization section below. After the components have been matched up to the services they are a part of this information is stored 640 in a services catalogue 645 so that they can be discovered by the end user.

Figure 7:
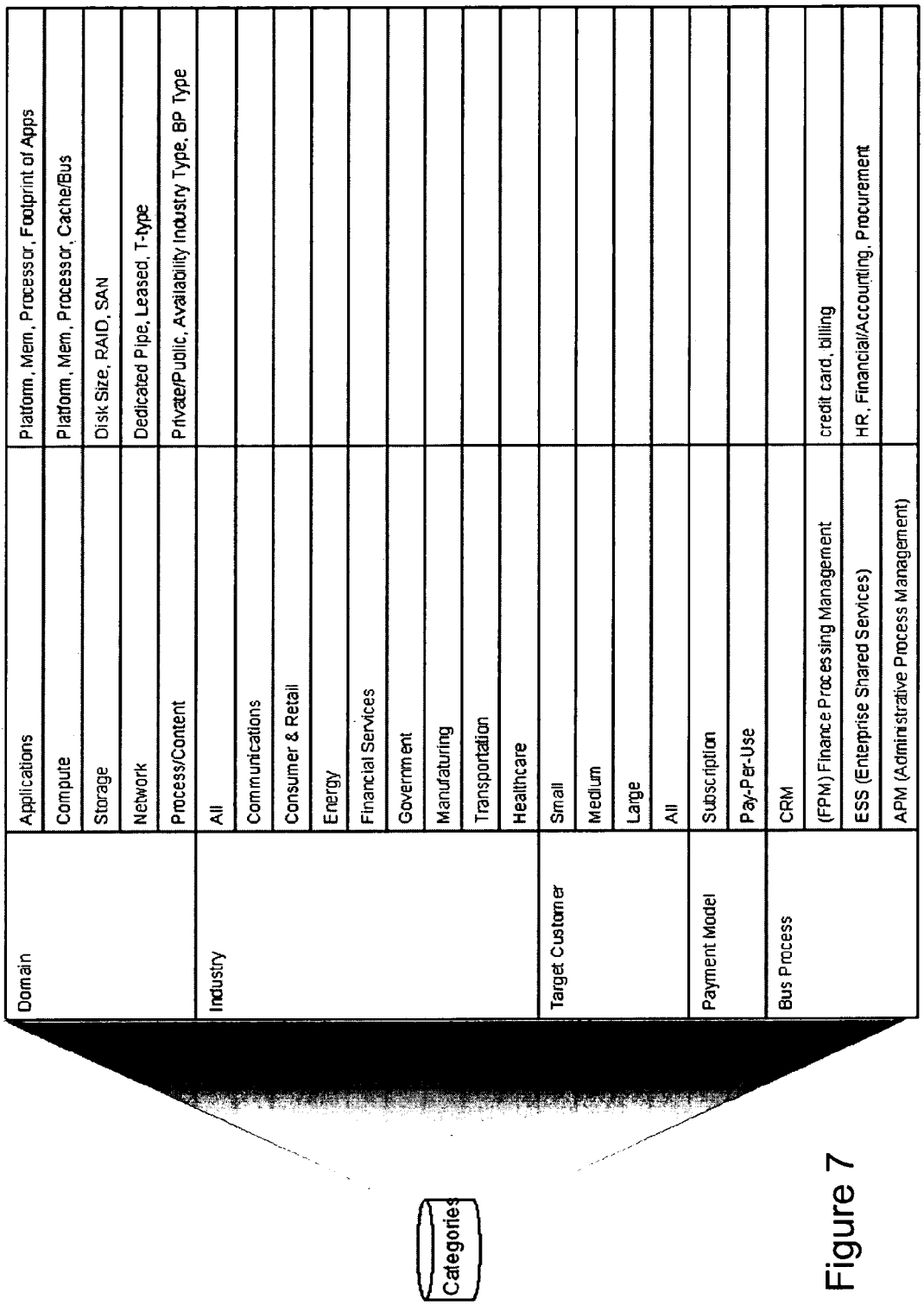
FIG. 7 illustrates the hierarchical metadata structure used to categorize a component in a preferred embodiment.

Component categorization: In order for the brokerage to enable the automation of categorizing components that are bundled into the services offered, a standard metadata model is used by both the brokerage and the component provider. The metadata model for component categorization, in the preferred embodiment, is a hierarchical structure that is broken down into five sections. Each section is then broken down into attributes, and those attributes may in turn be broken down recursively by sub-attributes. FIG. 7 illustrates the hierarchical metadata structure used to categorize a component in a preferred embodiment.

In this figure, the Domain section describes what the component type is. The component could be an application, compute power, storage, network, or content. Each type has sub-attributes associated with it. The Industry and Business Process sections will primarily only apply to content and applications. Compute, Storage, and Network will most likely apply to all industries and all Business Processes with a few exceptions. There are also sections to specify the Target Customer of the component and is recommended Payment Model as supplied by the component provider.

This metadata model is manifested in the categorization process in a Component Categorization File (CCF) that the component provider generates. The CCF self describes and categorizes the component. This is the metadata model that is used for component and service categorization.

Service Categorization: Once the component has been categorized and the metadata has been received by the brokerage it can be assembled into services of varying granularity. These services themselves have a metadata model so that they are also categorized.

Figure 8:
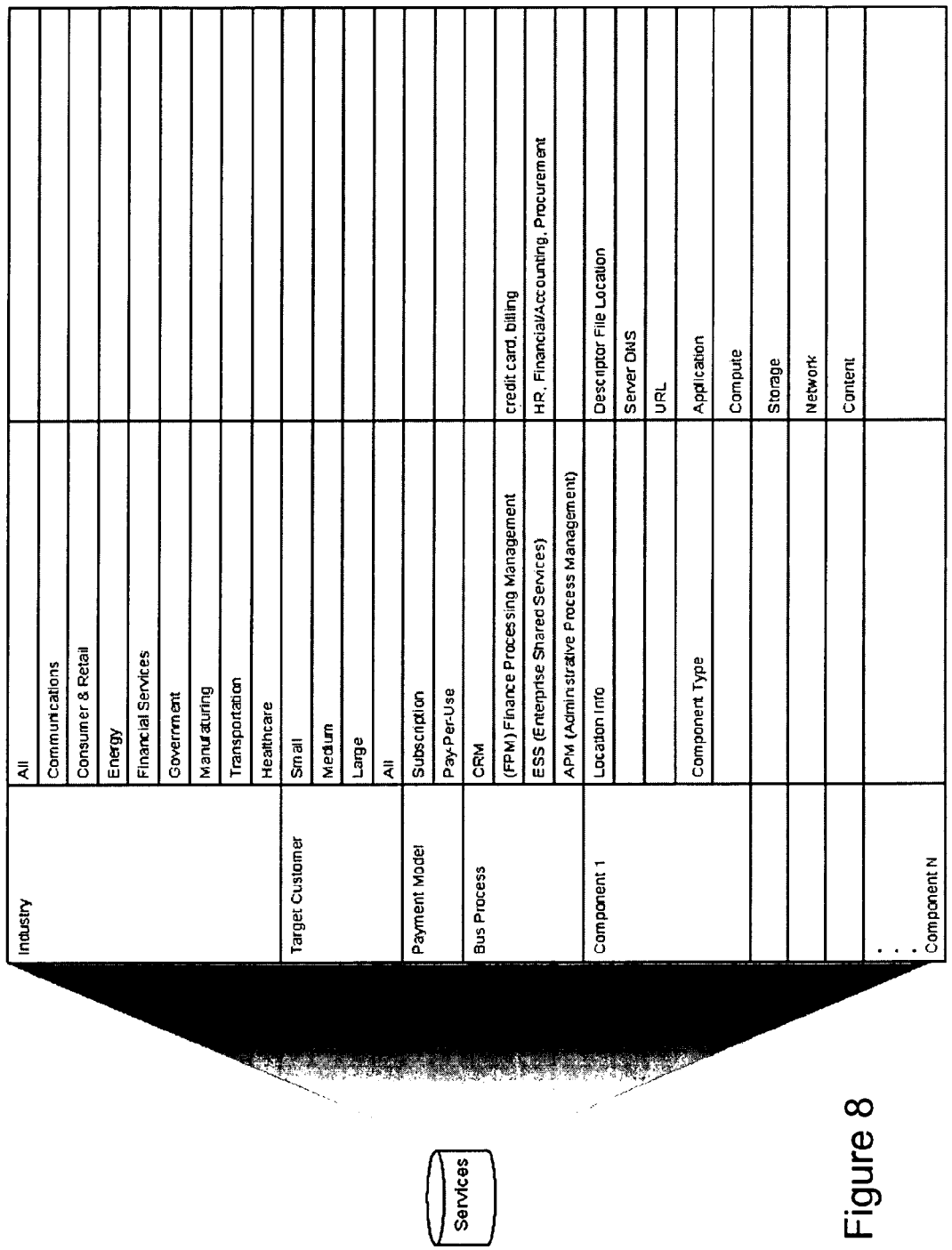
FIG. 8 depicts a metadata model for service categorization in accordance with a preferred embodiment.

FIG. 8 depicts a metadata model for service categorization in accordance with a preferred embodiment. The service categorization illustrated in FIG. 8 suggests a similar metadata model to the component categorization metadata model. The primary differences are that the Domain section has been dropped since the service is made up of multiple components and the Domain is specific to component type. For example, a service might consist of a storage component, a compute component, and an application component. Thus, the services categorization metadata model includes section for all of the components that make up the service.

The metadata model also consists of sections describing the industry and the business process that this service applies to. In both cases the service can be identified as applying to all industries and/or all business processes. In addition, the metadata model consists of sections that describe the target customer size for the service and the recommended payment model, according to vendor specifications or recommendations.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of the disclosed systems may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:
1. A method for managing services, comprising:
receiving, from a service provider, a data processing service component;
receiving, from the service provider, configuration data corresponding to the data processing service component;

introspecting the data processing service component to discover attributes and elements of the component and to abstract location information about how to execute, read, and invoke the component;

validating the configuration data; and storing categorization information of the data processing service component including the discovered attributes and elements of the component and the abstracted location information of the component and the validated configuration data, employing the categorization information to automatically assemble the data processing service component into a data processing service package.

2. The method of claim 1, wherein the configuration data includes information on how to execute, read, and invoke the data processing service component.

3. The method of claim 1, wherein the configuration data includes information defining the service domain of the data processing service component.

4. The method of claim 1, wherein the configuration data includes information defining the industry of the data processing service component.

5. The method of claim 1, wherein the configuration data includes information defining the target customer of the data processing service component.

6. The method of claim 1, wherein the configuration data includes information defining the business process of the data processing service component.

7. The method of claim 1, wherein the configuration data includes information defining the payment model of the data processing service component.

8. A data processing system comprising at least one processor;

accessible memory storing instructions that control the processor to perform tasks comprising:

receiving, from a service provider, a data processing service component;

receiving, from the service provider, configuration data corresponding to the data processing service component;

introspecting the data processing service component to discover attributes and elements of the component and to abstract location information about how to execute, read, and invoke the component;

validating the configuration data; and storing categorization information of the data processing service component including the discovered attributes and elements of the component and the abstracted location information of the component and the validated configuration data, employing the categorization information to automatically assemble the data processing service component into a data processing service package.

9. The data processing system of claim 8, wherein the configuration data includes information on how to execute, read, and invoke the data processing service component.

10. The data processing system of claim 8, wherein the configuration data includes information defining the service domain of the data processing service component.

11. The data processing system of claim 8, wherein the configuration data includes information defining the industry of the data processing service component.

12. The data processing system of claim 8, wherein the configuration data includes information defining the target customer of the data processing service component.

13. The data processing system of claim 8, wherein the configuration data includes information defining the business process of the data processing service component.

14. The data processing system of claim 8, wherein the configuration data includes information defining the payment model of the data processing service component.

15. A computer program product tangibly embodied in a non-transitory machine-readable storage medium containing instructions for controlling a data processing system to perform a method comprising:

receiving, from a service provider, a data processing service component;

receiving, from the service provider, configuration data corresponding to the data processing service component;

introspecting the data processing service component to discover attributes and elements of the component and to abstract location information about how to execute, read, and invoke the component;

validating the configuration data; and storing categorization information of the data processing service component including the discovered attributes and elements of the component and the abstracted location information of the component and the validated configuration data, employing the categorization information to automatically assemble the data processing service component into a data processing service package.

16. The computer program product of claim 15, wherein the configuration data includes information on how to execute, read, and invoke the data processing service component.

17. The computer program product of claim 15, wherein the configuration data includes information defining the service domain of the data processing service component.

18. The computer program product of claim 15, wherein the configuration data includes information defining the industry of the data processing service component.

19. The computer program product of claim 15, wherein the configuration data includes information defining the target customer of the data processing service component.

20. The computer program product of claim 15, wherein the configuration data includes information defining the business process of the data processing service component.

21. The computer program product of claim 15, wherein the configuration data includes information defining the payment model of the data processing service component.

* * * * *